(12) United States Patent
Labban

(10) Patent No.: US 11,617,636 B1
(45) Date of Patent: Apr. 4, 2023

(54) DENTAL SHADE MATCHING BACKGROUND TOOL

(71) Applicant: KING SAUD UNIVERSITY, Riyadh (SA)

(72) Inventor: Nawaf Yousef I. Labban, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 16/915,094

(22) Filed: Jun. 29, 2020

(51) Int. Cl.
*A61C 19/10* (2006.01)

(52) U.S. Cl.
CPC .................... *A61C 19/10* (2013.01)

(58) Field of Classification Search
CPC ........... A61C 19/04; A61C 19/10; A61C 5/20; A61C 2201/002
USPC .......................................................... 433/26
See application file for complete search history.

(56) References Cited

U.S. PATENT DOCUMENTS

| | | | |
|---|---|---|---|
| 2,479,543 A * | 8/1949 | Russell .................. | A61C 19/10 433/26 |
| 4,115,922 A | 9/1978 | Alderman | |
| 4,802,850 A | 2/1989 | Boon | |
| 5,066,227 A | 11/1991 | Pozzi | |
| 5,078,598 A | 1/1992 | Neisse | |
| 5,261,815 A | 11/1993 | Pozzi | |
| 5,989,022 A * | 11/1999 | Yamamoto ............. | B44D 3/003 433/26 |
| 6,743,014 B2 | 6/2004 | Kerschbaumer et al. | |
| 2002/0006598 A1* | 1/2002 | Pruden .................. | A61C 19/10 433/26 |
| 2010/0173257 A1 | 7/2010 | Yamamoto et al. | |

FOREIGN PATENT DOCUMENTS

FR 2464699 A1 3/1981

* cited by examiner

*Primary Examiner* — Edward Moran
(74) *Attorney, Agent, or Firm* — Nath, Goldberg & Meyer; Richard C. Litman

(57) ABSTRACT

The dental shade matching background tool has an elongate handle having a handgrip or finger-grip end and a dental shade guide attachment end. The dental shade guide attachment end has an upper surface defining a slot adapted for attaching the handle of a conventional dental shade guide to the tool, which snaps into or forms a friction fit in the slot. An offset neck slopes downward from the dental shade guide attachment end of the handle and has a background tab extending therefrom. The background tab has a face that is coated or covered with a neutral background color, such as gray. The background tab extends parallel to and beneath the tab of a dental shade guide retained in the slot at the dental shade guide attachment end of the handle.

2 Claims, 4 Drawing Sheets

DENTAL SHADE MATCHING BACKGROUND TOOL

BACKGROUND

1. Field

The disclosure of the present patent application relates to dental restoration procedures, and particularly to a dental shade matching background tool.

2. Description of the Related Art

The most frequently used technique for matching the shade of a patient's teeth to dental restoration materials involves visual comparison of the patient's teeth to commercially available dental shade guides. For example, the VITA classical A1-D4® shade guide, furnished by VITA North America of Yorba Linda, Calif., provides a set of sixteen shade guide tabs ranging from reddish-brownish to reddish-grayish. The technique involves holding each shade guide separately near the patient's teeth until the closest shade match is found.

While this is a common technique for matching the shade of teeth, it is not perfect. The perception of color may be subjective, and it may also be affected by lighting conditions and background colors in the surrounding environment. Thus, the instructions provided with dental shade guides frequently suggest that the colors in the background be kept as neutral as possible, and that any brightly colored clothing be covered with a gray cloth or drape. To some extent, the problem may be minimized by holding paper having a neutral color behind the shade guide tab. However, this would often require the help of a dental assistant, and may involve bringing unsterile paper in or near the patient's open mouth.

Although various devices and methods have been proposed for minimizing this problem, none have proven entirely satisfactory. Thus, a dental shade matching background tool solving the aforementioned problems is desired.

SUMMARY

The dental shade matching background tool has an elongate handle having a handgrip end and a dental shade guide attachment end. The dental shade guide attachment end has an upper surface defining a slot adapted for attaching the handle of a conventional dental shade guide to the tool, which snaps into or forms a friction fit in the slot. An offset neck slopes downward from the dental shade guide attachment end of the handle and has a background tab extending therefrom. The background tab has a face that is coated or covered with a neutral background color, such as gray. The background tab extends parallel to and beneath the tab of a dental shade guide retained in the slot at the dental shade guide attachment end of the handle. Thus, the dental practitioner may keep the patient's mouth open to expose the teeth with one hand while using the other hand to hold the tool and bring the dental shade guide close to the patient's teeth for a shade comparison with the shade guide tab framed against a neutral background color, thereby improving shade selection for the dental restoration material.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
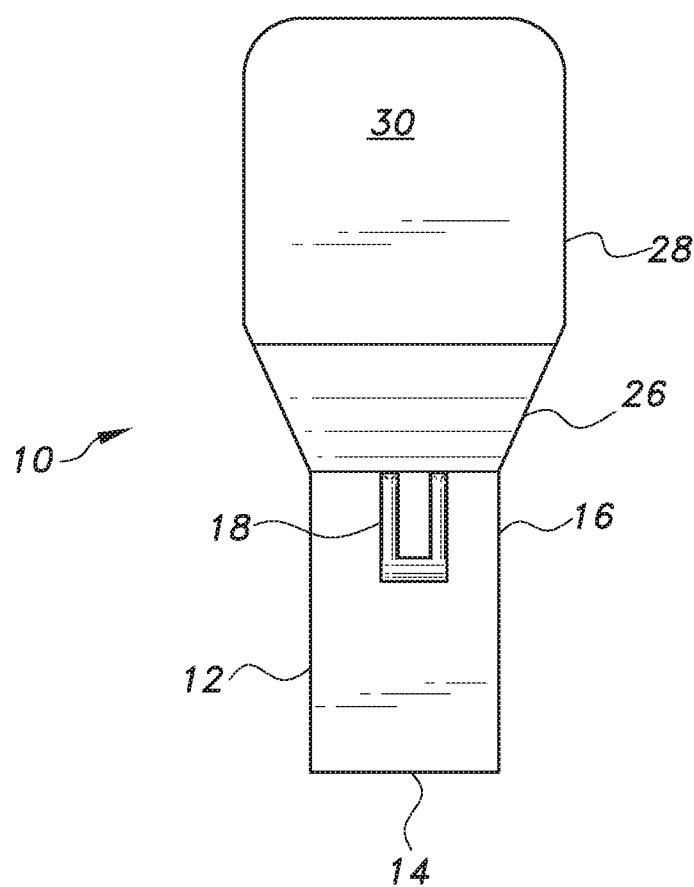
FIG. 1 is a front view of a dental shade matching background tool.
Figure 2:
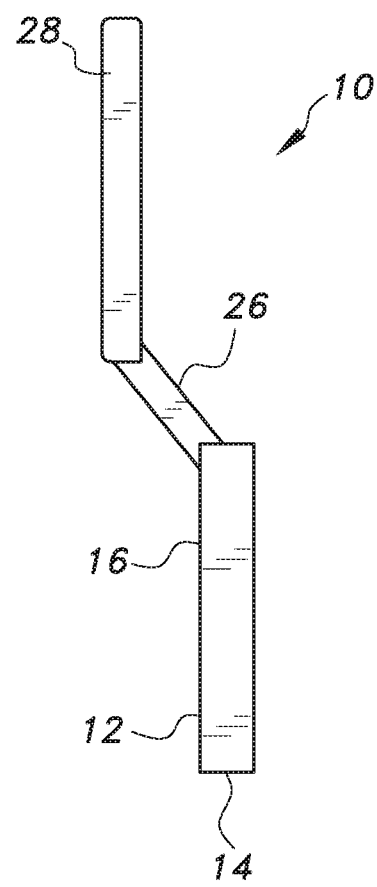
FIG. 2 is a side view of the dental shade matching background tool of FIG. 1.
Figure 3:
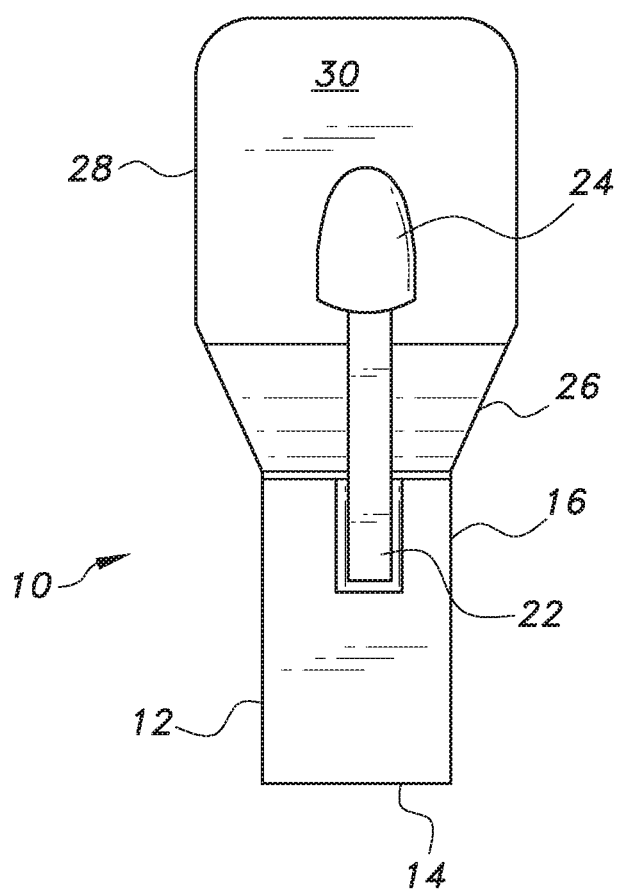
FIG. 3 is an environmental front view of a dental shade matching background tool, shown with a dental shade guide attached to the tool.
Figure 4:
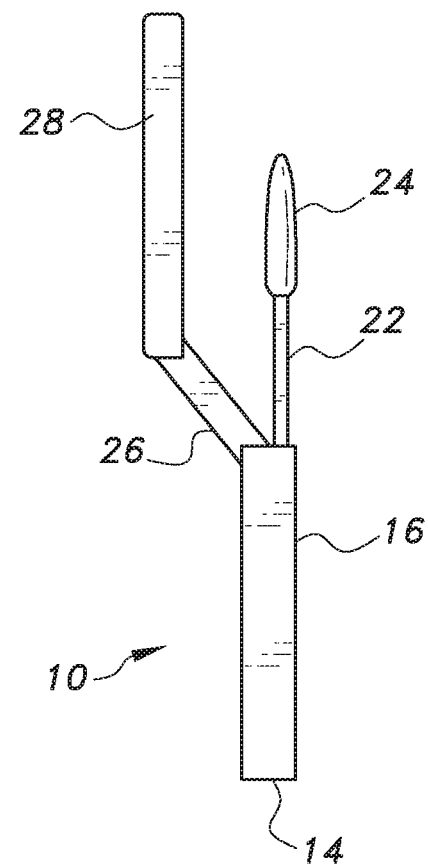
FIG. 4 is an environmental side view of the dental shade matching background tool of FIG. 1, shown with a dental shade guide attached to the tool.
Figure 5:
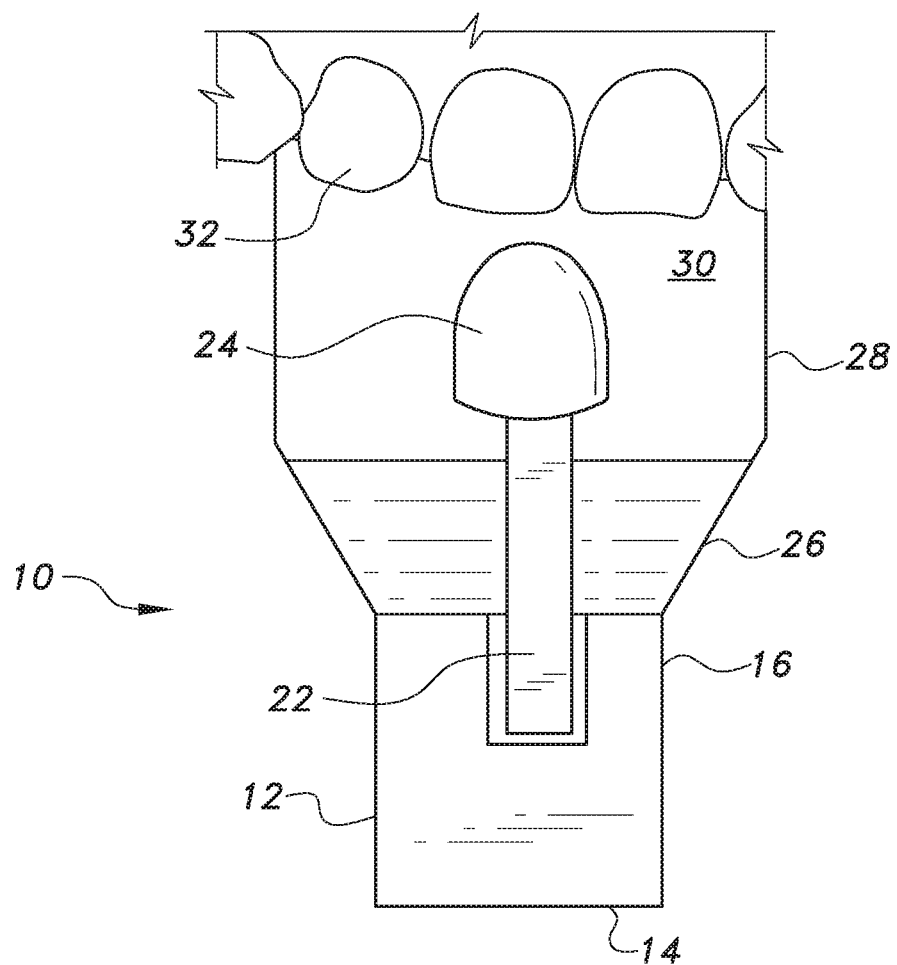
FIG. 5 is an environmental front view of a dental shade matching background tool, shown in use to match the shade of restorative material to the patient's teeth.
Figure 6:
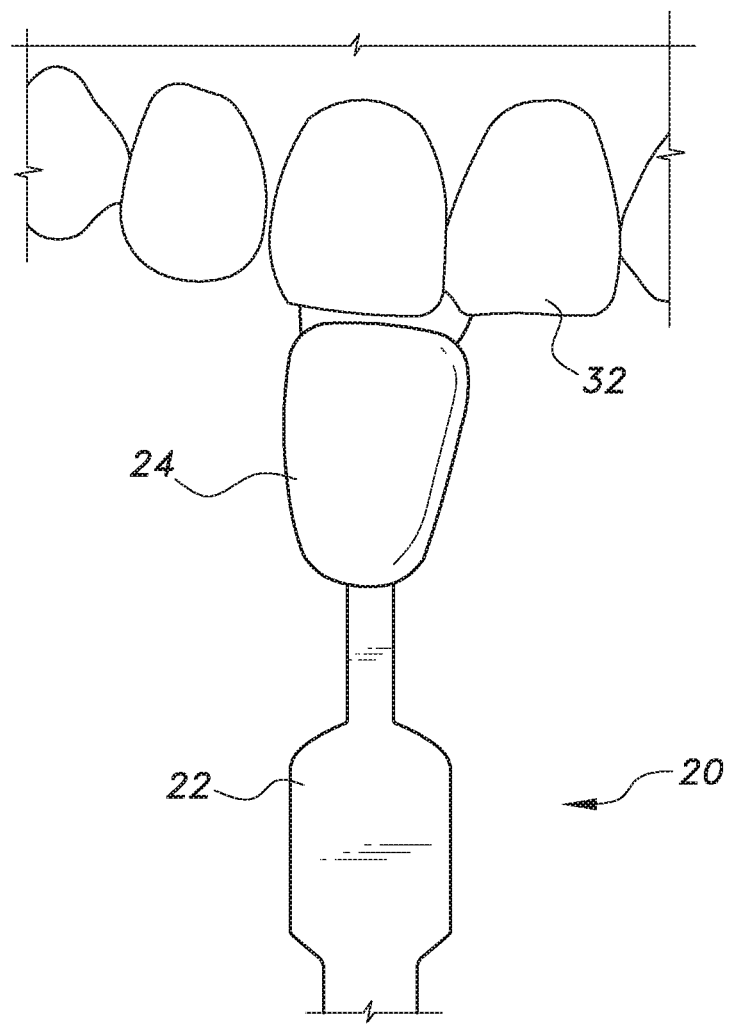
FIG. 6 is an environmental front view of a dental shade guide of the prior art, shown in use to match the shade of restorative material to the patient's teeth.

As shown in FIGS. 1 and 2, the dental shade matching background tool 10 has an elongate handle 12 having a handgrip or finger-grip end 14 and a dental shade guide attachment end 16. The dental shade guide attachment end 16 has an upper surface defining a slot 18 adapted for attaching the handle of a conventional dental shade guide to the tool 10, which snaps into or forms a friction fit in the slot 18. FIG. 6 shows a conventional dental shade guide 20, which has a handle 22 and a shade guide tab 24 or acrylic tooth. An offset neck 26 slopes downward from the dental shade guide attachment end 16 of the handle 12 and has a background tab 28 extending therefrom. The background tab 28 has a face 30 that is coated or covered with a neutral background color, such as gray. The background tab 28 extends parallel to and beneath the tab 24 or acrylic tooth of a dental shade guide retained in the slot 18 at the dental shade guide attachment end 16 of the handle, as shown in FIGS. 3 and 4 As shown in FIG. 5, the offset neck 26 may separate the background tab 28 far enough from the dental shade guide tab 24 and the background tab 28 may have sufficient length to extend far enough beyond the guide tab 24 that the background tab 28 may be positioned behind the patient's teeth 32 while comparing the shade of the guide tab 24 to the patient's teeth.

Thus, the dental practitioner may keep the patient's mouth open to expose the teeth 32 with one hand while using the other hand to hold the tool 10 and bring the dental shade guide close to the patient's teeth 32 for a shade comparison with the shade guide tab 24 framed against a neutral background color, thereby improving shade selection for the dental restoration material.

It is to be understood that the dental shade matching background tool is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A dental shade guide matching background tool, consisting of an elongate handle consisting of:
    a handgrip end having a longitudinal axis;
    a dental shade guide attachment end opposite the handgrip end, the dental shade guide attachment end having an upper surface, the upper surface only including a single slot substantially aligned with the longitudinal axis of the elongated handle, wherein the slot is adapted for attachment of a handle of a dental shade guide to the handle;

an offset neck sloping downward from the dental shade guide attachment end of the handle; and a background tab extending from the offset neck, the background tab extending parallel to the elongate handle, the background tab having a face coated with a neutral color so that the dental shade guide may be viewed against the neutral background color tab in order to better match the dental shade guide to the teeth of a user.

2. The dental shade guide matching background tool according to claim 1, wherein said neutral color is the color gray.

* * * * *